(12) United States Patent
Hwang et al.

(10) Patent No.: US 7,300,266 B2
(45) Date of Patent: Nov. 27, 2007

(54) ORBITING VANE COMPRESSOR INCORPORATING ORBITING VANE WITH OIL SUPPLY FUNCTION

(75) Inventors: Seon-woong Hwang, Anyang-Si (KR); Dong-won Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 11/111,861

(22) Filed: Apr. 22, 2005

(65) Prior Publication Data

US 2006/0073052 A1    Apr. 6, 2006

(30) Foreign Application Priority Data

Oct. 6, 2004    (KR) ............... 10-2004-0079622

(51) Int. Cl.
*F01C 21/04*    (2006.01)
*F04C 29/02*    (2006.01)
*F01M 1/00*    (2006.01)

(52) U.S. Cl. .................. 418/94; 418/59; 184/6.18

(58) Field of Classification Search ........... 418/59, 418/61.1, 94, 88; 184/6.16, 6.18
See application file for complete search history.

(56) References Cited

U.S. PATENT DOCUMENTS

| | | | | |
|---|---|---|---|---|
| 4,547,138 A | * | 10/1985 | Mabe et al. ............ | 418/55.6 |
| 4,696,630 A | * | 9/1987 | Sakata et al. .......... | 418/55.5 |
| 4,946,361 A | * | 8/1990 | DeBlois et al. ........ | 418/55.6 |
| 5,112,201 A | * | 5/1992 | Tamura et al. ......... | 417/366 |
| 5,178,527 A | * | 1/1993 | Jung ..................... | 418/55.6 |
| 5,395,224 A | * | 3/1995 | Caillat et al. .......... | 418/55.6 |
| 5,660,539 A | * | 8/1997 | Matsunaga et al. .... | 418/55.6 |
| 5,720,602 A | * | 2/1998 | Hill et al. .............. | 418/55.4 |
| 5,810,573 A | * | 9/1998 | Mitsunaga et al. .... | 418/55.6 |
| 5,931,650 A | * | 8/1999 | Yasu et al. ............. | 418/55.3 |
| 6,017,205 A | * | 1/2000 | Weatherston et al. .. | 418/55.6 |

(Continued)

FOREIGN PATENT DOCUMENTS

| KR | 10-1999-0037379 | | 5/1999 |
|---|---|---|---|
| KR | 1019990037379 | * | 5/1999 |
| KR | 10-2004-0007984 | | 1/2001 |
| KR | 1020040007984 | * | 1/2004 |

OTHER PUBLICATIONS

U.S. Appl. No. 10/974,778 to Kim et al., which was filed on Oct. 28, 2004.
English Language Abstract of KR 10-2004-0007984.
English Language Abstract of KR 10-1999-0037379.

*Primary Examiner*—Thomas Denion
*Assistant Examiner*—Mary A Davis
(74) *Attorney, Agent, or Firm*—Greenblum & Bernstein, P.L.C.

(57) ABSTRACT

Disclosed herein is an orbiting vane compressor incorporating an orbiting vane with oil supply function that is capable of performing more smooth orbiting movement. The orbiting vane has a compression unit comprising an orbiting vane having a boss formed in the center thereof such that the upper end of a crankshaft having an oil supplying channel formed therethrough is fixedly fitted in the boss, the orbiting vane being disposed between an annular space defined between the inner wall of a cylinder and an inner ring, and an Oldham's ring disposed at the lower surface of the orbiting vane for preventing rotation of the orbiting vane. An oil supplying hole is formed on a vane plate of the orbiting vane outside the boss for allowing oil to be supplied to the upper surface of the vane plate.

12 Claims, 6 Drawing Sheets

U.S. PATENT DOCUMENTS

| | | | |
|---|---|---|---|
| 6,071,100 A * | 6/2000 | Yamada et al. | 418/55.3 |
| 6,322,339 B1 * | 11/2001 | Mitsunaga et al. | 418/55.2 |
| 6,375,444 B1 * | 4/2002 | Dewar | 418/99 |
| 6,422,843 B1 * | 7/2002 | Sun et al. | 418/55.4 |
| 6,893,235 B2 * | 5/2005 | Furusho et al. | 418/55.5 |
| 7,018,185 B2 * | 3/2006 | Makino et al. | 418/94 |
| 2002/0110471 A1 * | 8/2002 | Sun et al. | 418/55.4 |
| 2004/0247474 A1 * | 12/2004 | Kitaura et al. | 418/55.4 |
| 2005/0063837 A1 | 3/2005 | Lee et al. | |

* cited by examiner

ORBITING VANE COMPRESSOR INCORPORATING ORBITING VANE WITH OIL SUPPLY FUNCTION

BACKGROUND OF THE INVENTION

1. Field of the Invention

The present invention relates to an orbiting vane compressor incorporating an orbiting vane with oil supply function, and, more particularly, to an orbiting vane compressor incorporating an orbiting vane with oil supply function that is capable of performing more smooth orbiting movement while minimizing friction generated when the orbiting vane performs the orbiting movement according to a compressing operation of the orbiting vane compressor.

2. Description of the Related Art

Figure 1:
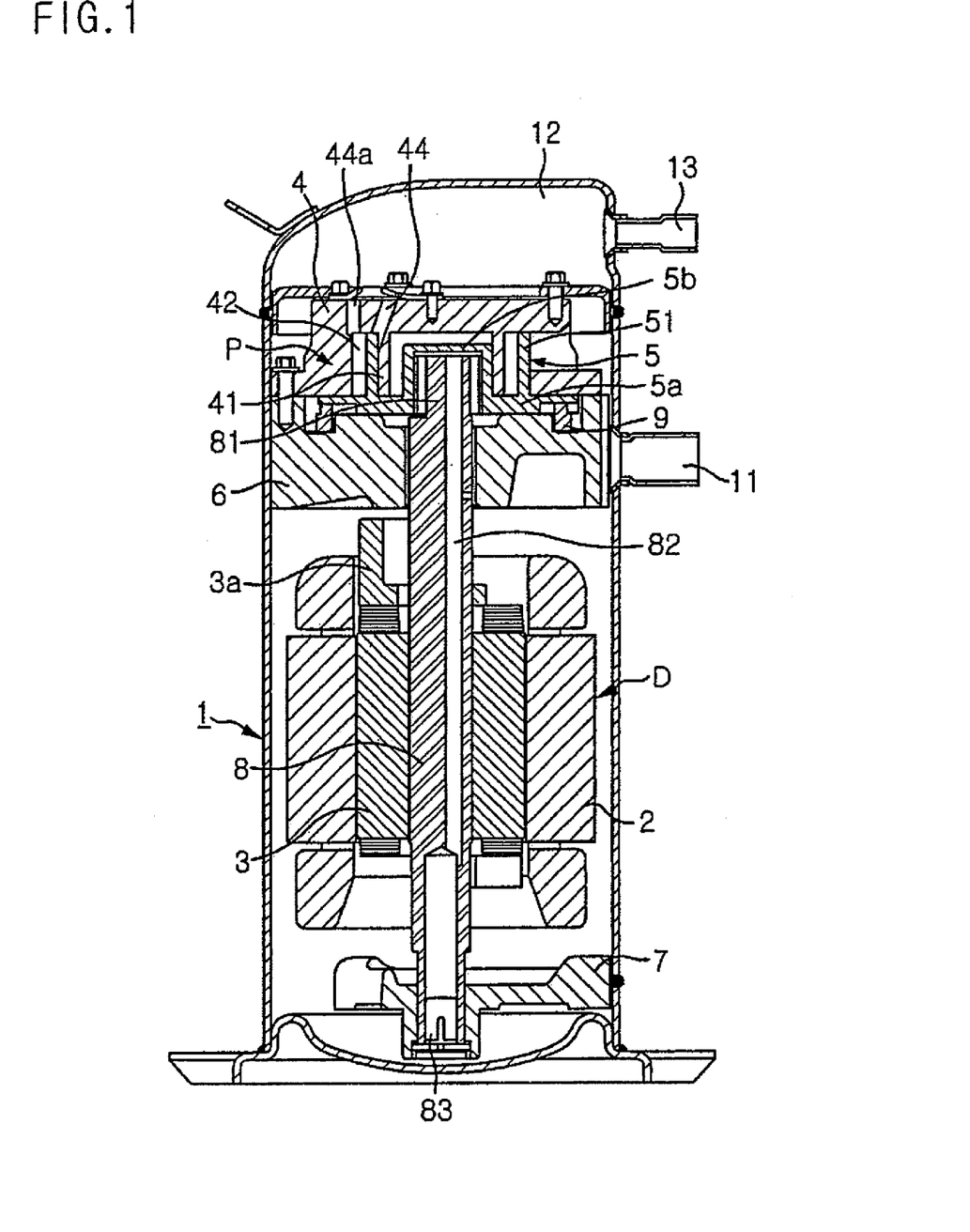
FIG. 1 is a longitudinal sectional view schematically illustrating the overall structure of a conventional orbiting vane compressor.

Referring to FIG. 1, there is illustrated a conventional orbiting vane compressor. As shown in FIG. 1, a drive unit D and a compression unit P are mounted in a shell 1 while the drive unit D and the compression unit P are hermetically sealed. The drive unit D and the compression unit P are connected to each other via a vertical crankshaft 8 rotatably supported by a main frame 6 and a subsidiary frame 7, which are disposed at the upper and lower parts of the vertical crankshaft 8, respectively, such that power from the drive unit D is transmitted to the compression unit P through the crankshaft 8.

The drive unit D comprises: a stator 2 fixedly disposed between the main frame 6 and the subsidiary frame 7; and a rotor 3 disposed in the stator 2 for rotating the crankshaft 8, which vertically extends through the rotor 3, when electric current is supplied to the rotor 3. The rotor 3 is provided at the top and bottom parts thereof with balance weights 3a, which are disposed symmetrically to each other for preventing the crankshaft 8 from being rotated in an unbalanced state due to a crank pin 81.

The compression unit P comprises an orbiting vane 5 having a boss 5b formed in the center of a vane plate 5a of the orbiting vane 5. The crank pin 81 of the crankshaft 8 is fixedly fitted in the boss 5b of the orbiting vane 5. As the orbiting vane 5 performs an orbiting movement in a cylinder 4, refrigerant gas introduced into the cylinder 4 is compressed while the orbiting vane 5 is prevented from being inclined to one side due to overturning moment generated when the refrigerant gas is compressed. The cylinder 4 comprises an inner ring 41 integrally formed at the upper part thereof while being protruded downward. The orbiting vane 5 comprises a circular vane 51 formed at the upper part thereof while being protruded upward. The circular vane 51 performs an orbiting movement in an annular space 42 defined between the inner ring 41 and the inner wall of the cylinder 4.

Through the orbiting movement of the circular vane 51, inner and outer compression chambers are formed at the inside and the outside of the circular vane 51, respectively. Refrigerant gases compressed in the inner and outer compression chambers are discharged out of the cylinder 4 through inner and outer outlet ports 44 and 44a formed at the upper part of the cylinder 4, respectively.

Between the main frame 6 and the orbiting vane 5 is disposed an Oldham's ring 9 for preventing rotation of the orbiting vane 5. Through the crankshaft 8 is longitudinally formed an oil supplying channel 82 for allowing oil to be supplied to the compression unit P therethrough when an oil pump 83 mounted at the lower end of the crankshaft 8 is operated.

Unexplained reference numeral 11 indicates an inlet tube, 12 a high-pressure chamber, and 13 an outlet tube.

Figure 2:
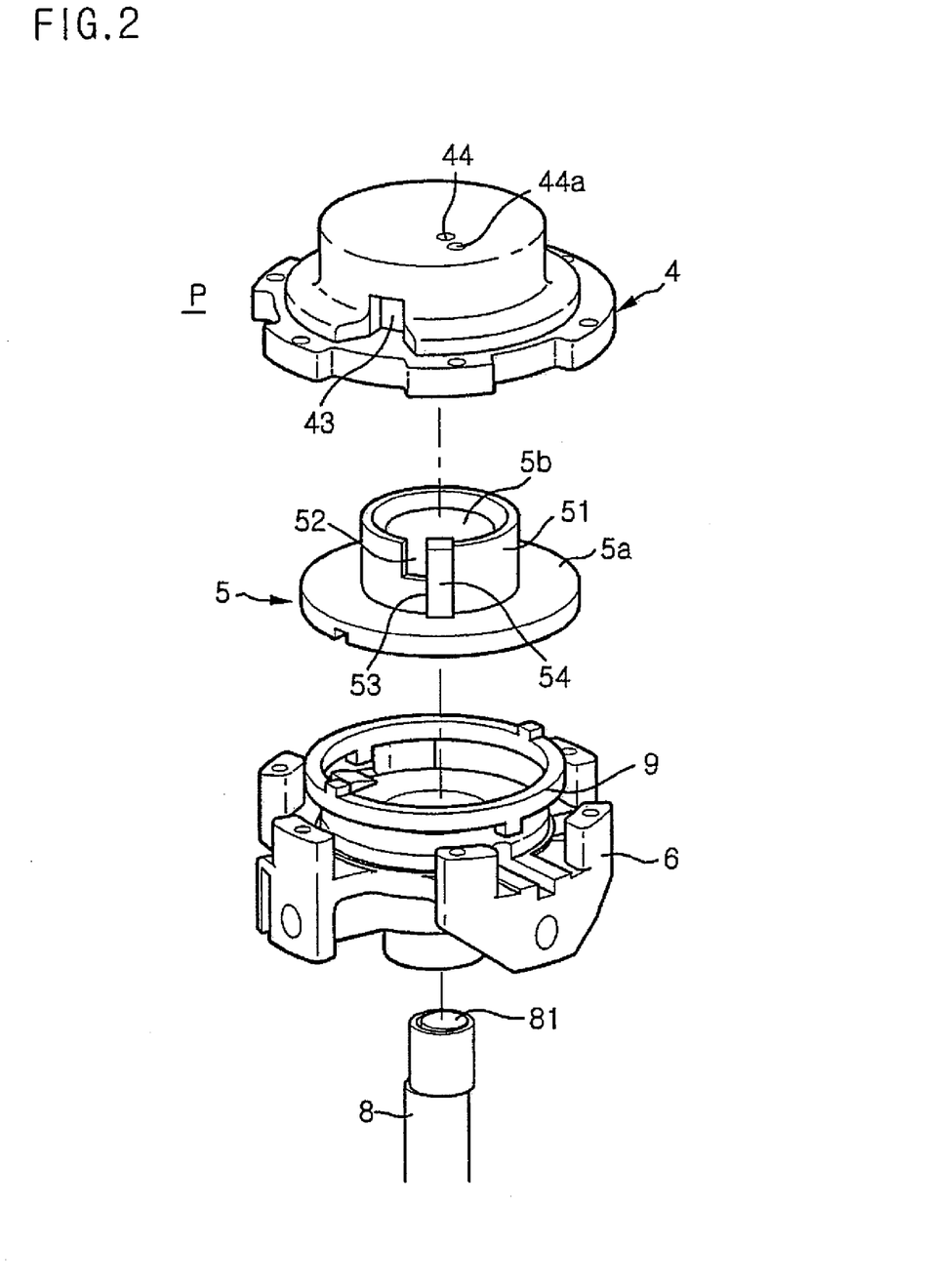
FIG. 2 is an exploded perspective view schematically illustrating the structure of a compression unit of the conventional orbiting vane compressor shown in FIG. 1.

FIG. 2 is an exploded perspective view illustrating the structure of the compression unit P shown in FIG. 1.

In the compression unit P of the orbiting vane compressor, as shown in FIG. 2, the orbiting vane 5, which is connected to the crankshaft 8, is disposed on the upper end of the main frame 6, which rotatably supports the upper part of the crankshaft 8. The cylinder 4, which is attached to the main frame 6, is disposed above the orbiting vane 5. The cylinder 4 is provided at a predetermined position of the circumferential part thereof with an inlet port 43. The inner and outer outlet ports 44 and 44a are formed at predetermined positions of the upper end of the cylinder 4.

The crank pin 81 of the crankshaft 8 is fixedly fitted in the boss 5b of the orbiting vane 5, which extends upward from the vane plate 5a of the orbiting vane 5. At a predetermined position of the circumferential part of the circular vane 51 of the orbiting vane 5 is formed a through-hole 52 for allowing refrigerant gas introduced through the inlet port 43 of the cylinder 4 to be guided into the circular vane 51 therethrough. At another predetermined position of the circumferential part of the circular vane 51 of the orbiting vane 5, which is adjacent to the position where the through-hole 52 is disposed, is formed an opening 53. A slider 54 is slidably disposed in the opening 53.

Figure 3:
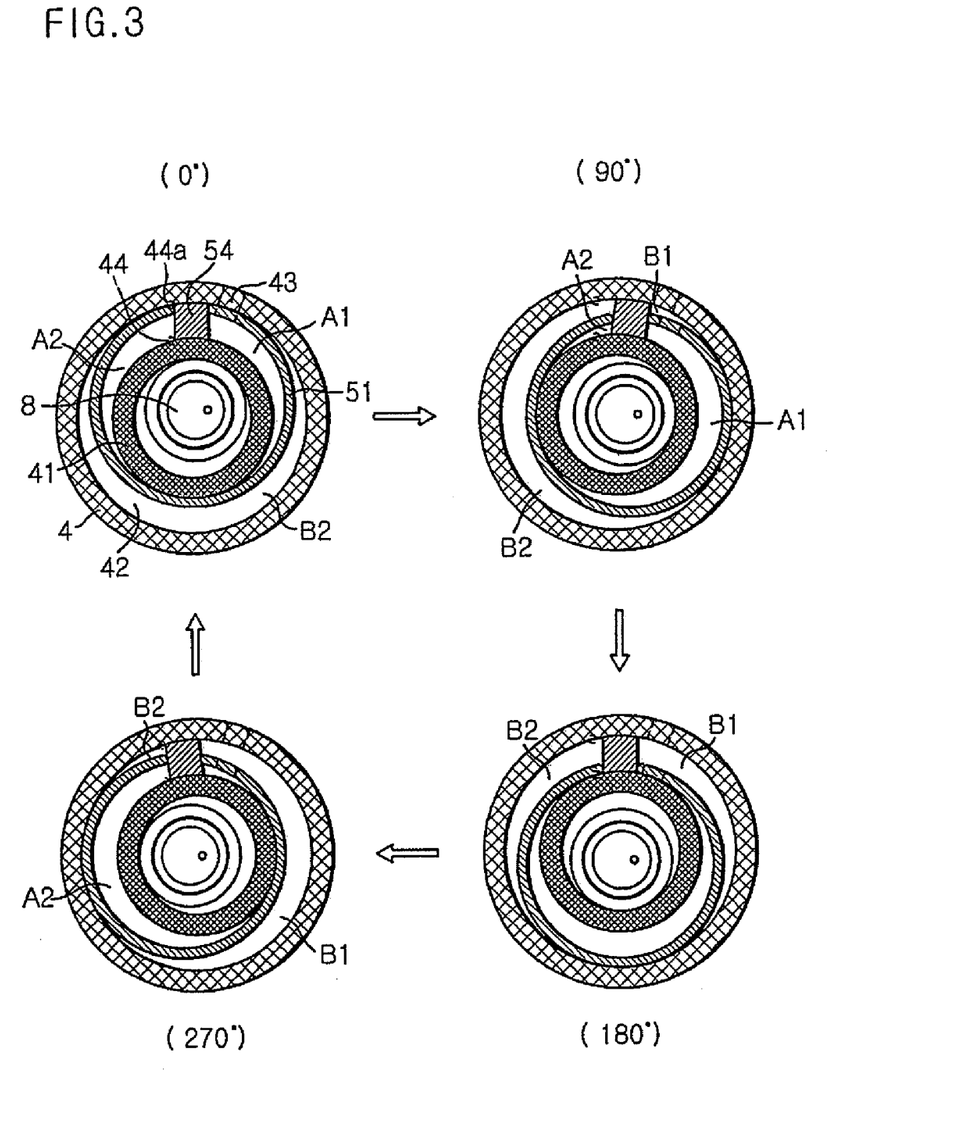
FIG. 3 is a cross-sectional view schematically illustrating the compressing operation of the compression unit shown in FIG. 2.

FIG. 3 is a cross-sectional view illustrating the compressing operation of the compression unit P shown in FIG. 2.

When the orbiting vane 5 of the compression unit P is driven by power transmitted to the compression unit P from the drive unit D through the crankshaft 8 (see FIG. 1), the circular vane 51 of the orbiting vane 5 disposed in the annular space 42 of the cylinder 4 performs an orbiting movement in the annular space 42 defined between the inner wall of the cylinder 4 and the inner ring 41, as indicated by arrows, to compress refrigerant gas introduced into the annular space 42 through the inlet port 43.

At the initial orbiting position of the orbiting vane 5 of the compression unit P (i.e., the 0-degree orbiting position), refrigerant gas is introduced into an inner suction chamber A1 through the inlet port 43 and the through-hole 52 of the circular vane 51, and compression is performed in an outer compression chamber B2 of the circular vane 51 while the outer compression chamber B2 does not communicate with the inlet port 43 and the outer outlet port 44a. Refrigerant gas is compressed in an inner compression chamber A2, and at the same time, the compressed refrigerant gas is discharged out of the inner compression chamber A2 through the inner outlet port 44.

At the 90-degree orbiting position of the orbiting vane 5 of the compression unit P, the compression is still performed in the outer compression chamber B2 of the circular vane 51, and almost all the compressed refrigerant gas is discharged out of the inner compression chamber A2 through the inner outlet port 44. At this stage, an outer suction chamber B1 appears so that refrigerant gas is introduced into the outer suction chamber B1 through the inlet port 43.

At the 180-degree orbiting position of the orbiting vane 5 of the compression unit P, the inner suction chamber A1 disappears. Specifically, the inner suction chamber A1 is changed into the inner compression chamber A2, and therefore, compression is performed in the inner compression chamber A2. At this stage, the outer compression chamber B2 communicates with the outer outlet port 44a. Consequently, compressed refrigerant gas is discharged out of the outer compression chamber B2 through the outer outlet port 44a.

At the 270-degree orbiting position of the orbiting vane 5 of the compression unit P, almost all the compressed refrigerant gas is discharged out of the outer compression chamber B2 of the circular vane 51 through the outer outlet port 44a, and the compression is still performed in the inner compression chamber A2 of the circular vane 51. Also, compression is newly performed in the outer suction chamber B1. When the orbiting vane 5 of the compression unit P further performs the orbiting movement by 90 degrees, the outer suction chamber B1 disappears. Specifically, the outer suction chamber B1 is changed into the outer compression chamber B2, and therefore, the compression is continuously performed in the outer compression chamber B2. As a result, the orbiting vane 5 of the compression unit P is returned to the position where the orbiting movement of the orbiting vane 5 is initiated. In this way, a 360-degree-per-cycle orbiting movement of the orbiting vane 5 of the compression unit P is accomplished. The orbiting movement of the orbiting vane 5 of the compression unit P is repeatedly performed in succession.

The slider 54 is slidably disposed in the opening 53 for maintaining the seal between the inner and outer compression chambers A2 and B2 of the circular vane 51.

When the compressing operation is carried out in the compression unit as described above, the orbiting vane performs the orbiting movement while the crank pin of the crankshaft is fixedly fitted in the boss formed on the vane plate of the orbiting vane. Consequently, the compressing operation is smoothly carried out while the orbiting vane is not inclined to one side, and therefore, compression in the compression unit is accomplished without compression efficiency of the orbiting vane compressor being lowered.

While the orbiting vane performs the orbiting movement according to the compressing operation in the compression unit, however, the lower end of the inner ring of the cylinder contacts the upper surface of the vane plate of the orbiting vane, and therefore, perpetual friction exists between the lower end of the inner ring of the cylinder and the upper surface of the vane plate of the orbiting vane. As a result, frictional noise is generated when the orbiting vane performs the orbiting movement. Furthermore, the orbiting movement of the orbiting vane is not smoothly carried out. Consequently, compression efficiency of the orbiting vane compressor is lowered.

In addition, perpetual friction is generated between the main frame and the Oldham's ring, which is disposed between the main frame and the lower surface of the orbiting vane for preventing rotation of the orbiting vane. As a result, the orbiting movement of the orbiting vane is not smoothly carried out.

SUMMARY OF THE INVENTION

Therefore, the present invention has been made in view of the above problems, and it is an object of the present invention to provide an orbiting vane compressor incorporating an orbiting vane with oil supply function that is capable of performing more smooth orbiting movement while minimizing friction generated when the orbiting vane performs the orbiting movement according to a compressing operation in a compression unit of the orbiting vane compressor.

It is another object of the present invention to provide an orbiting vane compressor incorporating an orbiting vane with oil supply function that is capable of performing more smooth orbiting movement while minimizing friction generated between a main frame and an Oldham's ring, which is disposed between the main frame and the orbiting vane for preventing rotation of the orbiting vane.

In accordance with the present invention, the above and other objects can be accomplished by the provision of an orbiting vane compressor incorporating an orbiting vane with oil supply function, comprising: a hermetically sealed shell having an inlet tube and an outlet tube; a crankshaft having upper and lower ends respectively supported by a main frame and a subsidiary frame in the shell, the crankshaft being rotated by a drive unit; an orbiting vane connected to the crankshaft for performing an orbiting movement in a cylinder to compress refrigerant gas introduced into the cylinder; an Oldham's ring disposed at the lower surface of the orbiting vane for preventing rotation of the orbiting vane; and an oil supplying hole formed through the orbiting vane for allowing oil to be supplied to the upper surface of the orbiting vane.

Preferably, the orbiting vane comprises: a circular vane formed at an upper part of a vane plate; and a boss formed in the circular vane such that the crankshaft is fitted in the boss.

Preferably, the crankshaft has an oil supplying channel formed longitudinally therethrough.

Preferably, the orbiting vane further comprises: an oil supplying hole formed through the vane plate outside the boss for allowing oil to be supplied to the upper surface of the vane plate.

Preferably, the orbiting vane further comprises: a subsidiary oil supplying hole connected in communication to the oil supplying hole for allowing oil to be supplied to the Oldham's ring therethrough.

Preferably, the oil supplying hole is formed through the vane plate from the upper surface to the lower surface of the vane plate such that the oil supplying hole is within the outer diameter of an inner ring disposed in the cylinder.

Preferably, the circular vane is provided at a predetermined position of the circumferential part thereof with an opening, and the orbiting vane further comprises: a slider disposed in the opening.

Preferably, the circular vane is provided at another predetermined position of the circumferential part thereof, adjacent to the position where the slider is disposed, with a through-hole for allowing refrigerant gas to be introduced into the circular vane therethrough.

Preferably, the cylinder is provided at a predetermined position of the circumferential part thereof with an inlet port, which communicates with the through-hole of the circular vane.

Preferably, the annular space defined in the cylinder is divided into inner and outer compression chambers by the circular vane of the orbiting vane, which is inserted in the annular space.

Preferably, the annular space is defined between the inner wall of the cylinder and an inner ring disposed in the cylinder.

Preferably, the cylinder is provided at the upper part thereof with a pair of inner and outer outlet ports, which communicate with the inner and outer compression chambers, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings. In the drawings, the same or similar elements are denoted by the same reference numerals even though they are depicted in different drawings.

Figure 4:
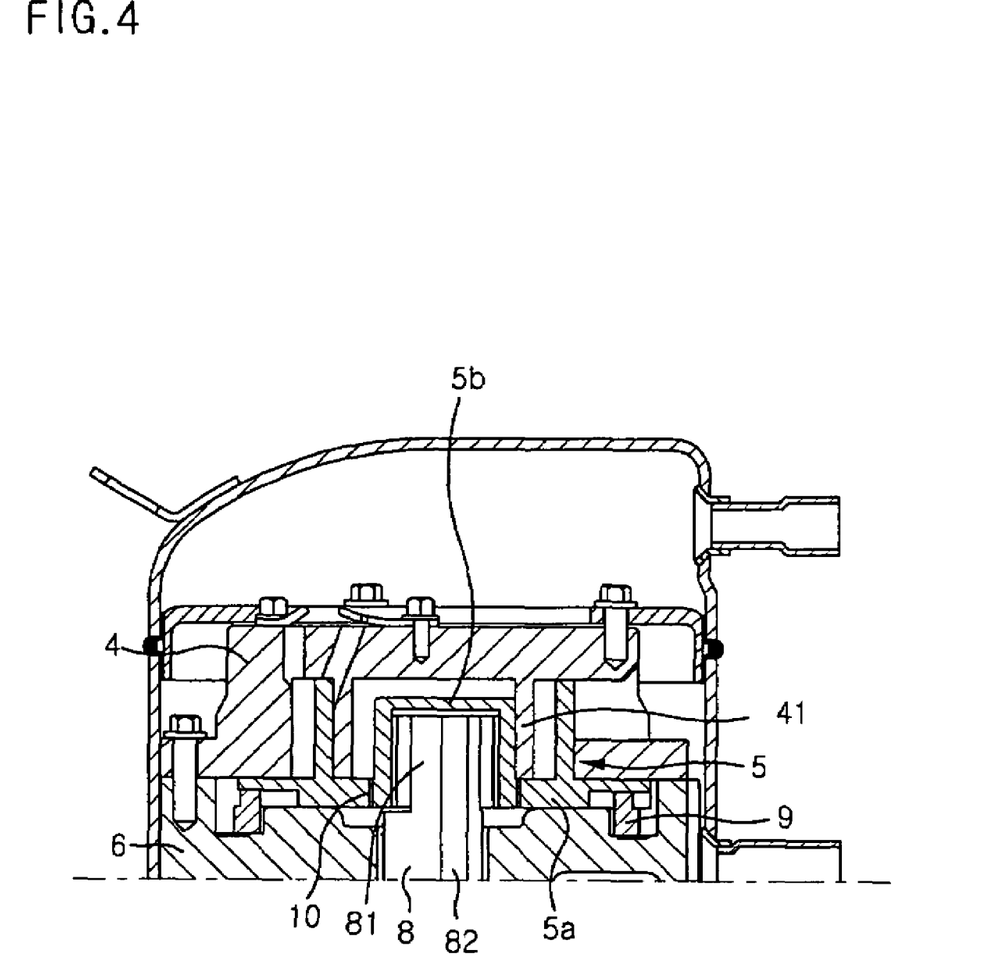
FIG. 4 is a longitudinal sectional view schematically illustrating an orbiting vane with oil supply function for orbiting vane compressors according to a preferred embodiment of the present invention.

FIG. 4 is a longitudinal sectional view schematically illustrating an orbiting vane with oil supply function for orbiting vane compressors according to a preferred embodiment of the present invention.

A compression unit of the orbiting vane compressor shown in FIG. 4 comprises an orbiting vane 5 having a boss 5b formed in the center thereof. In the boss 5b of the orbiting vane 5 is fixedly fitted a crank pin 81 of a crankshaft 8, the upper end of which is supported by a main frame 6. Through the crankshaft 8 is longitudinally formed an oil supplying channel 82 for allowing oil to be supplied to the compression unit P therethrough when an oil pump mounted at the lower end of the crankshaft 8 is operated. On a vane plate of the orbiting vane is formed a circular vane 51, which performs an orbiting movement in an annular space defined between the inner wall of a cylinder 4 and an inner ring 41 to compress refrigerant gas introduced into the cylinder 4.

Through the orbiting movement of the circular vane 51, inner and outer compression chambers are formed at the inside and the outside of the circular vane 51, respectively. Refrigerant gases compressed in the inner and outer compression chambers are discharged out of the cylinder 4 through inner and outer outlet ports 44 and 44a formed at the upper part of the cylinder 4, respectively. Between the main frame 6 and the lower surface of the orbiting vane 5 is disposed an Oldham's ring 9 for preventing rotation of the orbiting vane 5.

While the orbiting vane performs the orbiting movement according to the compressing operation in the compression unit, the lower end of the inner ring 41 of the cylinder 4 contacts the upper surface of the orbiting vane 5, and therefore, friction is generated between the lower end of the inner ring 41 of the cylinder 4 and the upper surface of the orbiting vane 5. As a result, frictional noise is generated when the orbiting vane performs the orbiting movement, and the orbiting movement of the orbiting vane is not smoothly carried out.

In order to perform smooth orbiting movement of the orbiting vane while minimizing friction, the orbiting vane 5 according to the present invention has an oil supplying hole 10 formed on a vane plate 5a outside the boss 5b of the orbiting vane 5 for allowing oil, which is supplied through the oil supplying channel 82 of the crankshaft 8 to accomplish smooth lubrication between the crank pin 81 of the crankshaft 8 and the boss 5b of the orbiting vane 5, to be supplied to the upper surface of the vane plate 5a therethrough when the orbiting vane 5 performs the orbiting movement.

Preferably, the oil supplying hole 10 is formed on the vane plate 5a of the orbiting vane 5 such that the oil supplying hole 10 does not go over the outer diameter of the inner ring 41 of the cylinder 4 when the orbiting vane 5 performs the orbiting movement. Consequently, compressed refrigerant gas is prevented from leaking through the oil supplying hole 10 when compression is performed in inner and outer compression chambers formed in the annular space according to the orbiting movement of the orbiting vane 5, and therefore, only the lubricating operation is smoothly carried out.

The oil supplying hole 10 may be formed in any shapes as long as the oil is supplied to the upper surface of the vane plate 5a through the oil supplying hole 10. For example, the oil supplying hole 10 may be formed vertically or in a tilted state through the vane plate 5a from the upper surface to the lower surface of the vane plate 5a.

Figure 5:
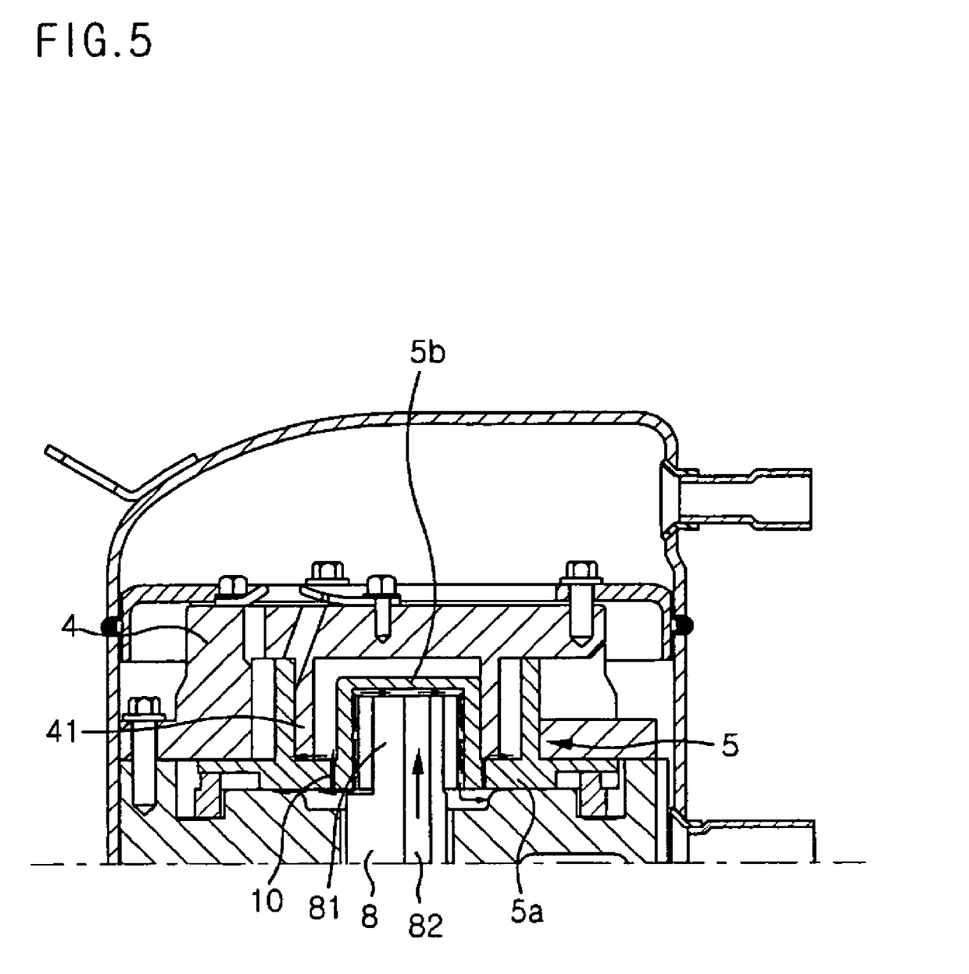
FIG. 5 is longitudinal sectional view schematically illustrating an oil-supplying operation in the orbiting vane with oil supply function for orbiting vane compressors according to the preferred embodiment of the present invention shown in FIG. 4.

FIG. 5 is longitudinal sectional view schematically illustrating an oil-supplying operation in the orbiting vane with oil supply function for orbiting vane compressors according to the preferred embodiment of the present invention shown in FIG. 4.

As the crankshaft 8 is rotated, the orbiting vane 5 performs an orbiting movement by the crank pin 81, which is fixedly fitted in the boss 5b formed at the vane plate 5a of the orbiting vane 5, to compress refrigerant gas introduced into the cylinder. At this time, oil supplied through the oil supplying channel 82 formed longitudinally through the crankshaft 8 is supplied into the space between the crank pin 81 and the boss 5b of the orbiting vane 5 to accomplish lubrication between the crank pin 81 and the boss 5b of the orbiting vane 5.

As the orbiting vane 5 performs the orbiting movement, some of the oil supplied as described above is supplied to the upper surface of the vane plate 5a through the oil supplying hole 10 formed on the vane plate 5a outside the boss 5b of the orbiting vane 5 for performing a lubricating operation between the lower end of the inner ring 41 of the cylinder and the upper surface of the vane plate 5a of the orbiting vane 5 during the orbiting movement of the orbiting vane 5.

Consequently, frictional noise is prevented from being generated between the lower end of the inner ring of the cylinder and the upper surface of the vane plate of the orbiting vane during the orbiting movement of the orbiting vane 5, and at the same time, the orbiting vane 5 performs more smooth orbiting movement through the lubricating operation of the oil between the lower end of the inner ring 41 of the cylinder and the upper surface of the vane plate 5a of the orbiting vane 5.

Figure 6:
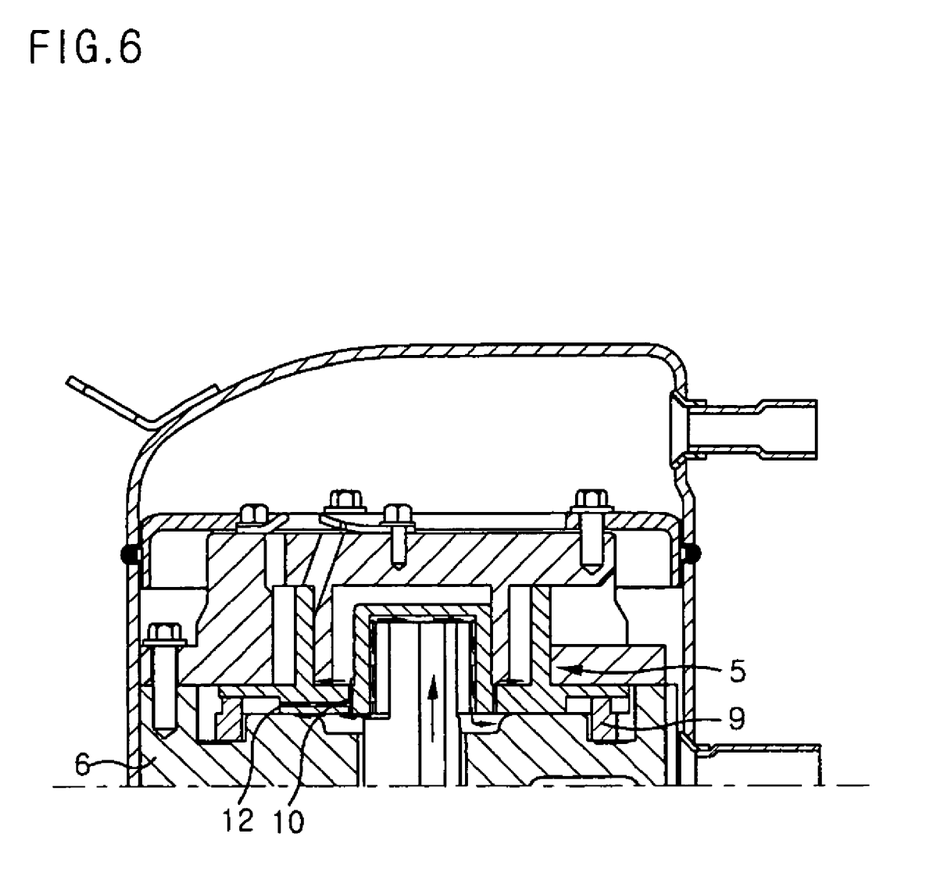
FIG. 6 is a longitudinal sectional view schematically illustrating an orbiting vane with oil supply function for orbiting vane compressors according to another preferred embodiment of the present invention.

FIG. 6 is a longitudinal sectional view schematically illustrating an orbiting vane with oil supply function for orbiting vane compressors according to another preferred embodiment of the present invention.

The Oldham's ring 9 is disposed between the main frame 6 and the orbiting vane 5 for preventing rotation of the orbiting vane 5. As a result, friction is generated between the lower surface of the Oldham's ring 9 and the main frame 6 when the orbiting vane performs the orbiting movement, by which the orbiting movement of the orbiting vane 5 is not smoothly carried out.

In order to minimize friction generated between the lower surface of the Oldham's ring 9 and the main frame 6 when the orbiting vane performs the orbiting movement, the orbiting vane 5 according to the present invention has a subsidiary oil supplying hole 12 connected in communication to the oil supplying hole 10 for allowing oil to be supplied to the Oldham's ring 9 therethrough.

As the orbiting vane 5 performs the orbiting movement, some of the oil supplied to the upper surface of the vane plate 5a through the oil supplying hole 10 formed on the vane plate 5a outside the boss 5b of the orbiting vane 5 is supplied to the Oldham's ring 9 disposed between the lower surface of the vane plate 5a and the main frame 6 through the subsidiary oil supplying hole 12 connected in communication to the oil supplying hole 10 for performing a lubricating operation between the lower surface of the Oldham's ring 9 and the main frame 6 during the orbiting movement of the orbiting vane 5.

Consequently, friction generated between the lower surface of the Oldham's ring 9 and the main frame 6 during the orbiting movement of the orbiting vane 5 is minimized, and therefore, the orbiting vane 5 performs more smooth orbiting movement through the lubricating operation of the oil between the lower surface of the Oldham's ring 9 and the main frame 6.

As apparent from the above description, some of the oil supplied through the crankshaft is introduced into the space between the upper surface of the vane plate of the orbiting vane and the lower end of the inner ring of the cylinder, which is in contact with the upper surface of the vane plate, when the orbiting vane performs the orbiting movement according to the compressing operation in the compression unit of the orbiting vane compressor. As a result, friction generated between the lower end of the inner ring of the cylinder and the upper surface of the vane plate of the orbiting vane is minimized, and therefore, frictional noise generated when the orbiting vane performs the orbiting movement is also minimized, and the orbiting movement of the orbiting vane is smoothly carried out. Consequently, the present invention has the effect of improving compression efficiency of the orbiting vane compressor.

Furthermore, some of the oil supplied through the crankshaft is also introduced into the space between the main frame and the Oldham's ring disposed between the lower surface of the vane plate of the orbiting vane and the main frame. As a result, friction generated between the Oldham's ring and the main frame during the orbiting movement of the orbiting vane is minimized, and therefore, the orbiting vane performs more smooth orbiting movement through the lubricating operation of the oil between the Oldham's ring and the main frame. Consequently, the present invention has the effect of maximizing compression efficiency of the orbiting vane compressor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compression unit of an orbiting vane compressor, comprising:
    a cylinder in which an inner ring is formed, an annular space existing between the inner ring and an inner wall of the cylinder, the cylinder being provided at an upper part of a main frame;
    a crankshaft through which an oil supplying channel is longitudinally formed, comprising a crank pin formed at an upper end thereof, the crankshaft being rotatably supported by the main frame;
    an orbiting vane, comprising:
        a boss in which the crank pin is fixedly fitted;
        a vane plate which is rotatably provided between the cylinder and the main frame, and formed around the boss; and
        a circular vane, disposed in the annular space, and formed on an upper part of the vane plate, an inner compression chamber being formed inside the circular vane, and an outer compression chamber being formed outside the circular vane,
    the orbiting vane compressing refrigerant gas introduced into the cylinder by performing an orbiting movement according to a rotation of the crankshaft;
    an Oldham's ring which is provided at a lower surface of the vane plate to prevent rotation of the orbiting vane;
    an oil supplying hole formed through the vane plate within a diameter of the inner ring, which supplies oil, introduced to the lower surface of the vane plate via the oil supplying channel, to an upper surface of the vane plate, the oil supplying hole not being in gaseous communication with the inner and outer compression chambers; and
    a subsidiary oil supplying hole, formed within the vane plate and connected to the oil supplying hole, which supplies oil to the Oldham's ring via the oil supplying hole.

2. The unit as set forth in claim 1, wherein an opening is provided on a circumferential part of the circular vane, and the orbiting vane further comprises a slider disposed in the opening.

3. The unit as set forth in claim 2, wherein a through-hole which introduces refrigerant gas into the circular vane is provided on the circumferential part of the circular vane adjacent to the slider.

4. The unit as set forth in claim 3, wherein an inlet port which communicates with the through-hole is provided on a circumferential part of the cylinder.

5. The unit as set forth in claim 1, wherein the annular space is defined by the inner wall of the cylinder and the inner ring.

6. The unit as set forth in claim 1, wherein a pair of inner and outer outlet ports, which communicate with the inner and outer compression chambers, respectively, are provided at an upper part of the cylinder.

7. An orbiting vane compressor comprising a orbiting vane with an oil supply function, comprising:
    a hermetically sealed shell having an inlet tube and an outlet tube;
    a crankshaft through which an oil supplying channel is longitudinally formed, comprising a crank pin formed at an upper end thereof, upper and lower ends of the crankshaft being rotatably supported by a main frame and a subsidiary frame of the shell, respectively, the crankshaft being rotated by a driving unit;

a cylinder in which an inner ring is formed, an annular space existing between the inner ring and an inner wall of the cylinder, the cylinder being provided at an upper part of a main frame;

an orbiting vane, comprising:
 a boss in which the crank pin is fixedly fitted;
 a vane plate which is rotatably provided between the cylinder and the main frame, and formed around the boss; and
 a circular vane, disposed in the annular space, and formed on an upper part of the vane plate, an inner compression chamber being formed inside the circular vane, and an outer compression chamber being formed outside the circular vane, the orbiting vane compressing refrigerant gas introduced into the cylinder by performing an orbiting movement according to a rotation of the crankshaft;

an Oldham's ring which is provided at a lower surface of the vane plate to prevent rotation of the orbiting vane;

an oil supplying hole formed through the vane plate within a diameter of the inner ring, which supplies oil, introduced to the lower surface of the vane plate via the oil supplying channel, to an upper surface of the vane plate, the oil supplying hole not being in gaseous communication with the inner and outer compression chambers; and a subsidiary oil supplying hole, formed within the vane plate and connected to the oil supplying hole, which supplies oil to the Oldham's ring via the oil supplying hole.

8. The compressor as set forth in claim 7, wherein an opening is provided on a circumferential part of the circular vane, and the orbiting vane further comprises a slider disposed in the opening.

9. The compressor as set forth in claim 8, wherein a through-hole which introduces refrigerant gas into the circular vane is provided on the circumferential part of the circular vane adjacent to the slider.

10. The compressor as set forth in claim 9, wherein an inlet port which communicates with the through-hole is provided on a circumferential part of the cylinder.

11. The compressor as set forth in claim 7, wherein the annular space is defined by the inner wall of the cylinder and the inner ring.

12. The compressor as set forth in claim 7, wherein a pair of inner and outer outlet ports, which communicate with the inner and outer compression chambers, respectively, are provided at an upper part of the cylinder.

* * * * *